US007149877B2

(12) United States Patent
Dhong et al.

(10) Patent No.: US 7,149,877 B2
(45) Date of Patent: Dec. 12, 2006

(54) BYTE EXECUTION UNIT FOR CARRYING OUT BYTE INSTRUCTIONS IN A PROCESSOR

(75) Inventors: Sang Hoo Dhong, Austin, TX (US); Hwa-Joon Oh, Austin, TX (US); Brad William Michael, Cedar Park, TX (US); Silvia Melitta Mueller, St. Ingbert (DE); Kevin D. Tran, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 10/621,908

(22) Filed: Jul. 17, 2003

(65) Prior Publication Data

US 2005/0015576 A1   Jan. 20, 2005

(51) Int. Cl.
*G06F 15/76* (2006.01)

(52) U.S. Cl. .............................. 712/22; 712/2; 712/221

(58) Field of Classification Search .................. 712/22, 712/221
See application file for complete search history.

(56) References Cited

U.S. PATENT DOCUMENTS

| 6,070,237 | A  | * | 5/2000  | Peleg et al. ................. | 712/210 |
| 6,243,803 | B1 | * | 6/2001  | Abdallah et al. ............ | 712/210 |
| 6,282,556 | B1 | * | 8/2001  | Chehrazi et al. ............ | 708/521 |
| 2004/0199751 | A1 | * | 10/2004 | Johnson et al. ............. | 712/221 |

OTHER PUBLICATIONS

"AMD 3DNow! Technology: Architecture and Implementations"; Stuart Oberman, Greg Favor, and Fred Weber; 1999, IEEE.*
"IA-64 Application Developer's Architecture Guide"; Intel; 1999; pp. 7-140, 7-141, 7-152, 7-153.*
"MMX Technology Architecture Overview"; Millind Mittal, Alex Peleg, Uri Weiser; 1997; Intel Technology Journal.*
"AltiVec: Bringing Vector Technology to the PowerPC Processor Family"; Jon Tyler, Jeff Lent, Anh Mather, Huy Nguyen; 1999; IEEE.*
"AltiVec Technology Programming Environments Manual"; Feb. 2002; Chapter 1 (pp. 1-12) and Chapter 6 (pp. 1-8, 170).*
"AltiVec: Bringing Vector Technology to the PowerPC Processor Family"; Tyler et al.; 1999; IEEE.*

* cited by examiner

*Primary Examiner*—Fritz Fleming
*Assistant Examiner*—Benjamin Geib
(74) *Attorney, Agent, or Firm*—Stephen R. Tkacs; Stephen J. Walder, Jr.; Diana R. Gerhardt (57) ABSTRACT

A disclosed byte execution unit receives byte instruction information and two operands, and performs an operation specified by the byte instruction information upon one or both of the operands, thereby producing a result. The byte instruction specifies either a count ones in bytes operation, an average bytes operation, an absolute differences of bytes operation, or a sum bytes into halfwords operation. In one embodiment, the byte execution unit includes multiple byte units. Each byte unit includes multiple population counters, two compressor units, adder input multiplexer logic, adder logic, and result multiplexer logic. A data processing system is described including a processor coupled to a memory system. The processor includes the byte execution unit. The memory system includes a byte instruction, wherein the byte instruction specifies either the count ones in bytes operation, the average bytes operation, the absolute differences of bytes operation, or the sum bytes into halfwords operation.

11 Claims, 8 Drawing Sheets

BYTE EXECUTION UNIT FOR CARRYING OUT BYTE INSTRUCTIONS IN A PROCESSOR

TECHNICAL FIELD

This invention relates generally to data processing systems and, more particularly, to instruction execution units of processors of data processing systems.

BACKGROUND OF THE INVENTION

In many audio-visual or multimedia applications involving images, sound, and/or moving pictures (i.e., videos), the basic unit of data is the 8-bit byte. An 8-bit data byte can represent any one of $2^8=256$ different binary levels, and two 8-bit bytes can represent any one of $2^{16}=65,536$ different binary levels. The levels may be equally sized (linear quantization) or different sizes (e.g., logarithmic quantization). For example, in the United States, telephone voice signals are typically sampled using logarithmic u-law encoding.

Images and individual frames of moving pictures or videos are made up of two-dimensional arrays of picture elements (i.e., "pixels") called bitmaps. Each pixel is typically represented by a collection of bits conveying intensity and/or color. For example, a single bit allows only two values (e.g., black and white), while 8 bits allows $2^8=256$ different values (e.g., black, white, and 254 intermediate shades of gray).

The acronym "MPEG" is commonly used to refer to the family of standards developed by the Moving Picture Experts Group (MPEG) for coding audio-visual information (e.g., movies, video, music) in a digital compressed format. MPEG data compression has greatly facilitated the storing and distribution of digital video and audio signals.

In general, MPEG video data compression predicts motion from frame to frame in time, then uses discrete cosine transforms (DCTs) to organize redundancy in other dimensions (i.e., other "spatial directions"). Motion prediction is typically performed on 16×16 pixel blocks called "macroblocks," and DCTs are performed on 8×8 pixel blocks of the macroblocks. For example, given a 16×16 macroblock in a current frame, an attempt is made to find a closely matching macroblock in a previous or future frame. If a close match is found, DCTs are performed on differences between the 8×8 pixel blocks of the current macroblock and the close match. On the other hand, if a close match is not found, DCTs are performed directly on the 8×8 pixel blocks of the current macroblock. The resulting DCT coefficients are then divided by a determined value (i.e., "quantized") and Huffman coded using fixed tables.

In the MPEG standards, the fundamental unit of data is the 8-bit byte. Each pixel of a video frame typically has three color components, each represented by one or more bytes. For example, each pixel may be represented by a 24-bit red-green-blue (RGB) value having one byte for red, one byte for green, and one byte for blue.

It would thus be advantageous to have a computer system capable of efficiently operating on 8-bit data bytes.

SUMMARY OF THE INVENTION

A disclosed byte execution unit receives byte instruction information and two operands, and performs an operation specified by the byte instruction information upon one or both of the operands, thereby producing a result. The byte instruction specifies either a count ones in bytes operation, an average bytes operation, an absolute differences of bytes operation, or a sum bytes into halfwords operation. In one embodiment, the byte execution unit includes multiple byte units. Each byte unit includes multiple population counters, two compressor units, adder input multiplexer logic, adder logic, and result multiplexer logic.

A data processing system is described including a processor coupled to a memory system. The processor includes the byte execution unit. The memory system includes a byte instruction, wherein the byte instruction specifies either the count ones in bytes operation, the average bytes operation, the absolute differences of bytes operation, or the sum bytes into halfwords operation.

BRIEF DESCRIPTION OF THE DRAWINGS

The invention may be understood by reference to the following description taken in conjunction with the accompanying drawings, in which like reference numerals identify similar elements, and in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
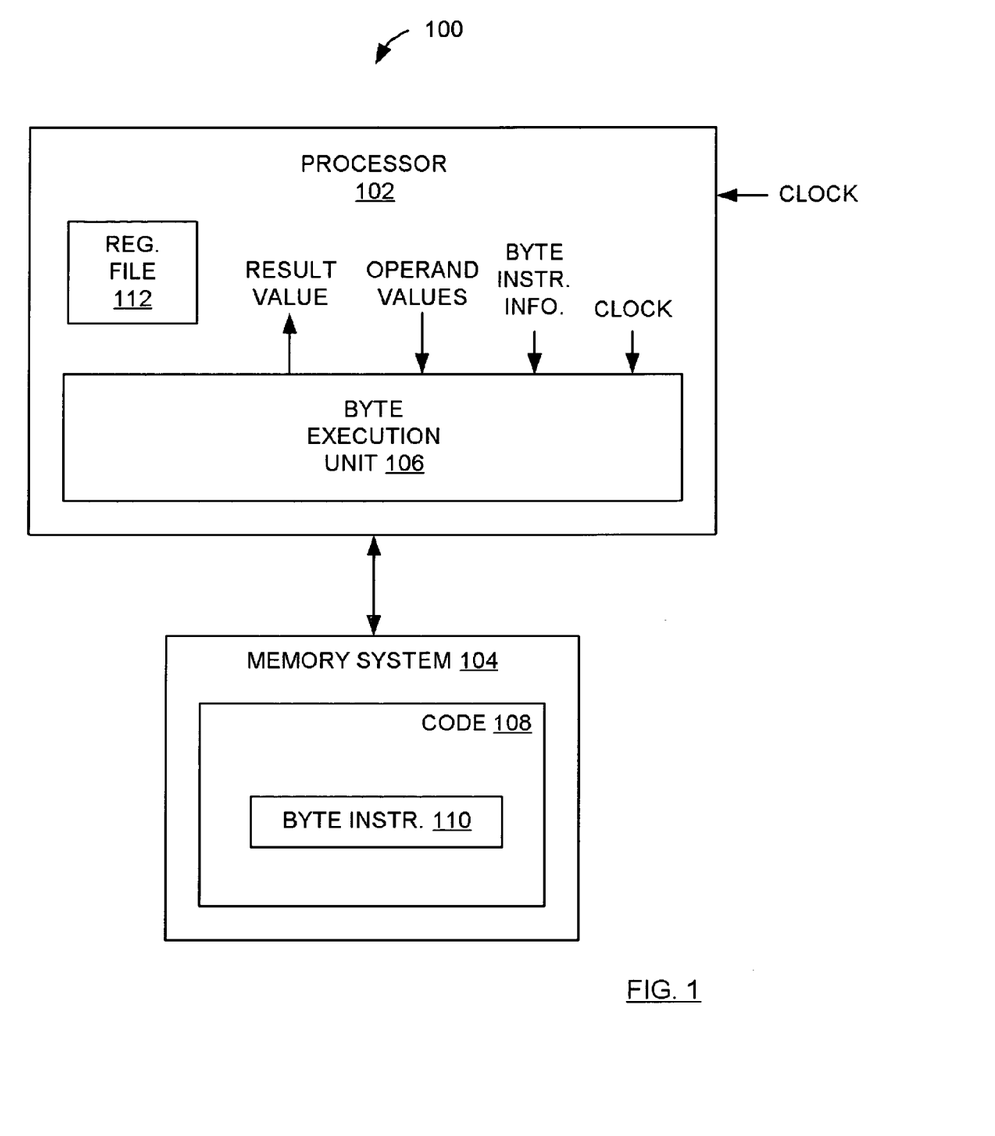
FIG. 1 is a diagram of one embodiment of a data processing system including a processor coupled to a memory system, wherein a byte instruction is stored in the memory system, and wherein the processor includes a byte execution unit for performing operations on 8-bit data units (i.e., byte operations)

FIG. 1 is a diagram of one embodiment of a data processing system 100 including a processor 102 coupled to a memory system 104. The processor 102 includes a byte execution unit 106 for performing operations on 8-bit data units (i.e., byte operations). In general, the processor 102 fetches and executes instructions of a predefined instruction set stored in the memory system 104. As illustrated in FIG. 1, the memory system 104 includes a software program (i.e., code) 108 including instructions from the instruction set. The code 108 includes a byte instruction 110 of the instruction set. The byte instruction 110 specifies a byte operation, and the byte execution unit 106 performs the specified byte operation.

As indicated in FIG. 1, the processor 102 receives a clock signal "CLOCK." The processor 102 executes instructions dependent upon the CLOCK signal. In one embodiment, the processor 102 includes several functional units, and operations performed by the functional units are synchronized by the CLOCK signal.

In the embodiment of FIG. 1, the byte instruction 110 may be one of several byte instructions each specifying a different byte operation. In general, the byte execution unit 106 is used to carry out the byte operation specified by the byte instruction 110. When the processor 102 fetches the byte instruction 110 from the memory system 104, the byte execution unit 106 receives byte instruction information and operand values. The byte instruction information indicates the particular byte instruction and specifies the byte operation to be performed. The byte execution unit 106 performs the specified byte operation, thereby producing a result value, and provides the result value to other circuitry within the processor 102 as indicated in FIG. 1.

In the embodiment of FIG. 1, the processor 102 also includes a register file 112. As described below, the operand values provided to the byte execution unit 106 are values stored in specific registers of the register file 112, and the result value is to be stored in a specific register of the register file 112.

In one embodiment, the instruction set executable by the processor 102 of FIG. 1 includes the following four byte instructions described in detail below: "CNTB" (count ones in bytes), "AVGB" (average bytes), "ABSDB" (absolute differences of bytes), and "SUMB" (sum bytes into half words). As used herein, the term "word" refers to a 32-bit data unit, thus a half word is a 16-bit data unit. The byte instruction 110 of FIG. 1 may be, for example, a CNTB instruction, an AVGB instruction, an ABSDB instruction, or a SUMB instruction.

Figure 2:
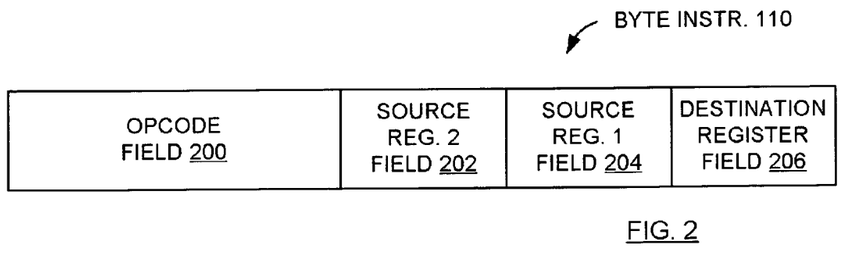
FIG. 2 is a diagram of one embodiment of the byte instruction of FIG. 1.

FIG. 2 is a diagram of one embodiment of the byte instruction 110 of FIG. 1. In the embodiment of FIG. 2, the byte instruction 10 includes an opcode field 200, a source register 2 field 202, a source register 1 field 204, and a destination register field 206. The opcode field 200 contains a value identifying the instruction as a byte instruction and specifying the byte operation to be performed.

The source register 2 field 202 specifies a register of the register file 112 of FIG. 1 containing a first operand value. The source register 1 field 204 specifies another register of the register file 112 containing a second operand value. The destination register field 206 specifies a third register of the register file 112 in which the result value produced by the byte execution unit 106 of FIG. 1 is to be stored.

In one embodiment, the byte instruction 110 is the "count ones in bytes" instruction having the mnemonic "CNTB." The opcode field 200 of the CNTB instruction is an 11-bit field identifying the instruction as the CNTB instruction, the source register 2 field 202 is ignored, the source register 1 field 204 specifies a source register "RA," and the destination register field 206 specifies a destination register "RT."

In one embodiment, the register file 112 of FIG. 1 includes 128 128-bit registers each having a different 7-bit address. The source register RA is a 128-bit register containing 16 8-bit "byte slots" referred to as RA[0] through RA[15]. Similarly, the destination register RT is a 128-bit register containing 16 8-bit byte slots referred to as RT[0] through RT[15].

An assembly language instruction using the CNTB instruction is expressed "CNTB RT,RA" wherein the RT register is the destination register and the RA register is the source register. In general, execution of the CNTB instruction involves carrying out the following operations for each of 16 byte slots of the source register RA and the destination register RT: (i) count the number of bits in a byte slot of the source register RA, and (ii) store the count in the corresponding byte slot of the destination register. The following pseudo code expresses the operation the processor 102 of FIG. 1 carries out when executing the CNTB instruction:

```
FOR J = 0 TO 15      '16 BYTE SLOTS
   C = 0             'COUNT OF ONES
   B = RA[J]         'SET B TO VALUE OF BYTE SLOT J OF RA
   FOR M = 0 TO 7
      IF B[M] = 1 THEN C = C + 1
   END
   RT[J] = C         'STORE COUNT C IN BYTE SLOT J OF RT
END
```

In another embodiment, the byte instruction 110 is the "average bytes" instruction having the mnemonic "AVGB." The opcode field 200 of the AVGB instruction is an 11-bit field identifying the instruction as the AVGB instruction, the source register 2 field 202 specifies a source register "RB," the source register 1 field 204 specifies the source register RA, and the destination register field 206 specifies the destination register RT.

As described above, the source register RA is a 128-bit register containing 16 8-bit byte slots referred to as RA[0] through RA[15], and the destination register RT is a 128-bit register containing 16 8-bit byte slots referred to as RT[0] through RT[15]. Similarly, the source register RB is a 128-bit register containing 16 8-bit byte slots referred to as RB[0] through RB[15].

An assembly language instruction using the AVGB instruction is expressed "AVGB RT,RA,RB" wherein the RT register is the destination register and the RA and RB registers are the source registers. In general, execution of the AVGB instruction involves carrying out the following operations for each of the 16 byte slots of the source and destination registers: (i) compute an average of values stored in the corresponding byte slots of the RA and RB source registers, and (ii) store the average of values in the corresponding byte slot of the destination register. The following pseudo code expresses the operation the processor 102 of FIG. 1 carries out when executing the AVGB instruction:

```
FOR J = 0 TO 15      '16 BYTE SLOTS
   RT[J] = (RA[J] + RB[J] + 1) >> 1    'RIGHT SHIFT TO DIVIDE BY 2
END
```

In another embodiment, the byte instruction 110 is the "absolute difference of bytes" instruction having the mnemonic "ABSDB." The opcode field 200 of the ABSDB instruction is an 11-bit field identifying the instruction as the ABSDB instruction, the source register 2 field 202 specifies the source register RB, the source register 1 field 204 specifies the source register RA, and the destination register field 206 specifies the destination register RT.

An assembly language instruction using the ABSDB instruction is expressed "ABSDB RT,RA,RB" wherein the RT register is the destination register and the RA and RB registers are the source registers. In general, execution of the ABSDB instruction involves carrying out the following operations for each of 16 byte slots of the source and destination registers: (i) subtract a value stored in a byte slot of the RA source register from a value stored in the corresponding byte slot of the RB source register, (ii) compute an absolute value of a result of the subtraction operation, and (iii) store the absolute value of the result of the subtraction operation in the corresponding byte slot of the destination register. The following pseudo code expresses the operation the processor 102 of FIG. 1 carries out when executing the ABSDB instruction:

```
FOR J = 0 TO 15    '16 BYTE SLOTS
    RT[J] = ABS(RB[J] − RA[J])  'ABSOLUTE  DIFFERENCE  OF
OPERANDS
    END
```

In another embodiment, the byte instruction 110 is the "sum bytes into half words" instruction having the mnemonic "SUMB." The opcode field 200 of the SUMB instruction is an 11-bit field identifying the instruction as the SUMB instruction, the source register 2 field 202 specifies the source register RB, the source register 1 field 204 specifies the source register RA, and the destination register field 206 specifies the destination register RT.

An assembly language instruction using the SUMB instruction is expressed "SUMB RT,RA,RB" wherein the RT register is the destination register and the RA and RB registers are the source registers. In general, execution of the SUMB instruction involves carrying out the following operations for each of 4 16-bit (double byte) word slots: (i) compute a first sum of values stored in the next 4 consecutive byte slots of the source register RB, (ii) store the sum in the next 2 consecutive byte slots of the destination register RT, (iii) compute a second sum of values stored in the next 4 consecutive byte slots of the source register RA, and (iv) store the second sum in the next 2 consecutive byte slots of the destination register RT. The following pseudo code expresses the operation the processor 102 of FIG. 1 carries out when executing the SUMB instruction:

RT[0:1]=RB[0]+RB[1]+RB[2]+RB[3]
RT[2:3]=RA[0]+RA[1]+RA[2]+RA[3]
RT[4:5]=RB[4]+RB[5]+RB[6]+RB[7]
RT[6:7]=RA[4]+RA[5]+RA[6]+RA[7]
RT[10:11]=RA[8]+RAB[9]+RA[10]+RA[11]
RT[12:13]=RB[12]+RB[13]+RB[14]+RB[15]
RT[14:15]=RA[12]+RAB[13]+RA[14]+RA[15]

Figure 3:
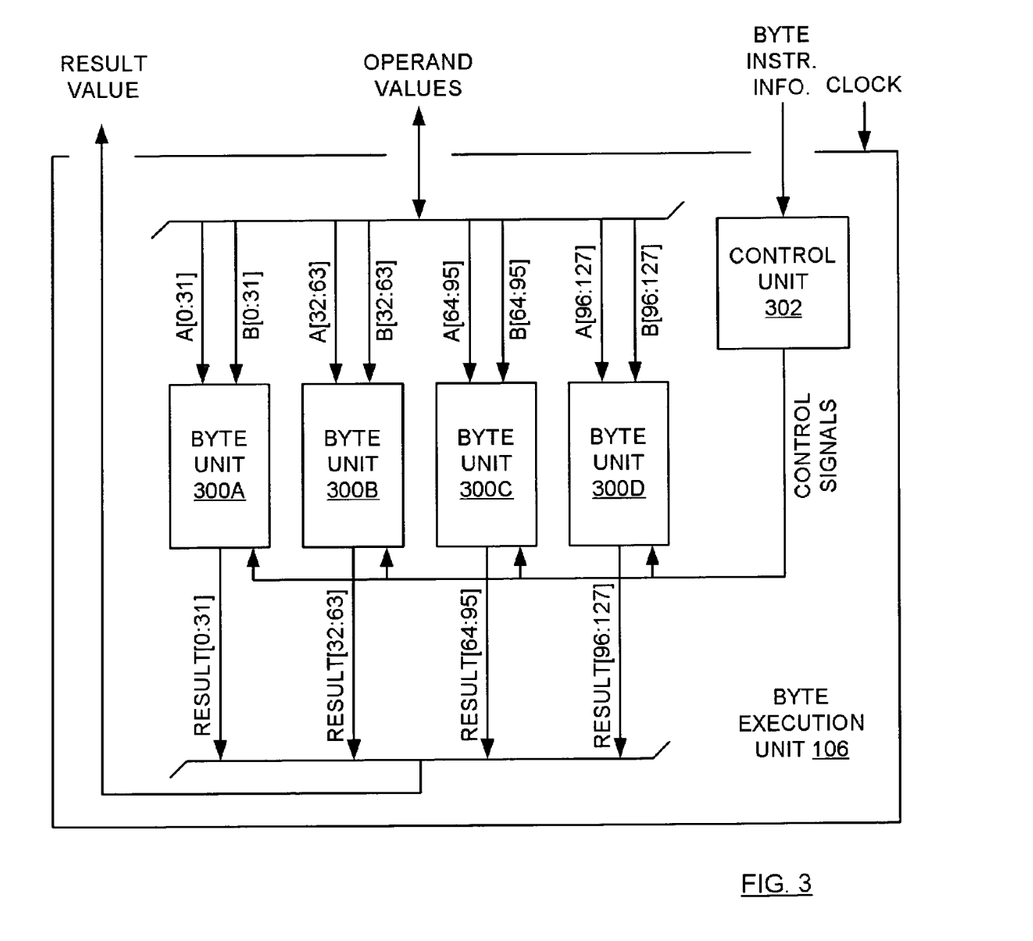
FIG. 3 is a diagram of one embodiment of the byte execution unit of FIG. 1, wherein the byte execution unit includes four byte units and a control unit.

FIG. 3 is a diagram of one embodiment of the byte execution unit 106 of FIG. 1. In the embodiment of FIG. 3, the byte execution unit 106 includes four byte units 300A–300D and a control unit 302. The control unit receives the byte instruction information specifying the byte operation, and produces control signals dependent upon the byte instruction information. Each of the four byte units 300A–300D receives 32-bit portions of two 128-bit operands "A" and "B," and control signals from the control unit 302, and produces a 32-bit portion of a 128-bit result value "RESULT" dependent upon the control signals. For example, as indicated in FIG. 3, the byte unit 300A receives the 32-bit portions "A[0:31]" and "B[0:31]" of the respective operands A and B, and control signals from the control unit 302, and performs an operation on the operand values dependent on the control signals, thereby producing a 32-bit result value "RESULT[0:31]."

In the embodiment described below, ordered sets of bits are numbered such that higher valued (i.e., more significant) bits have lower numbers than lower valued (i.e., less significant) bits. For example, the A[0:31] operand includes bits A[0] through A[31], wherein the bit A[0] is the highest valued (most significant) bit and bit A[31] is the lowest valued (least significant) bit.

Figure 4A:
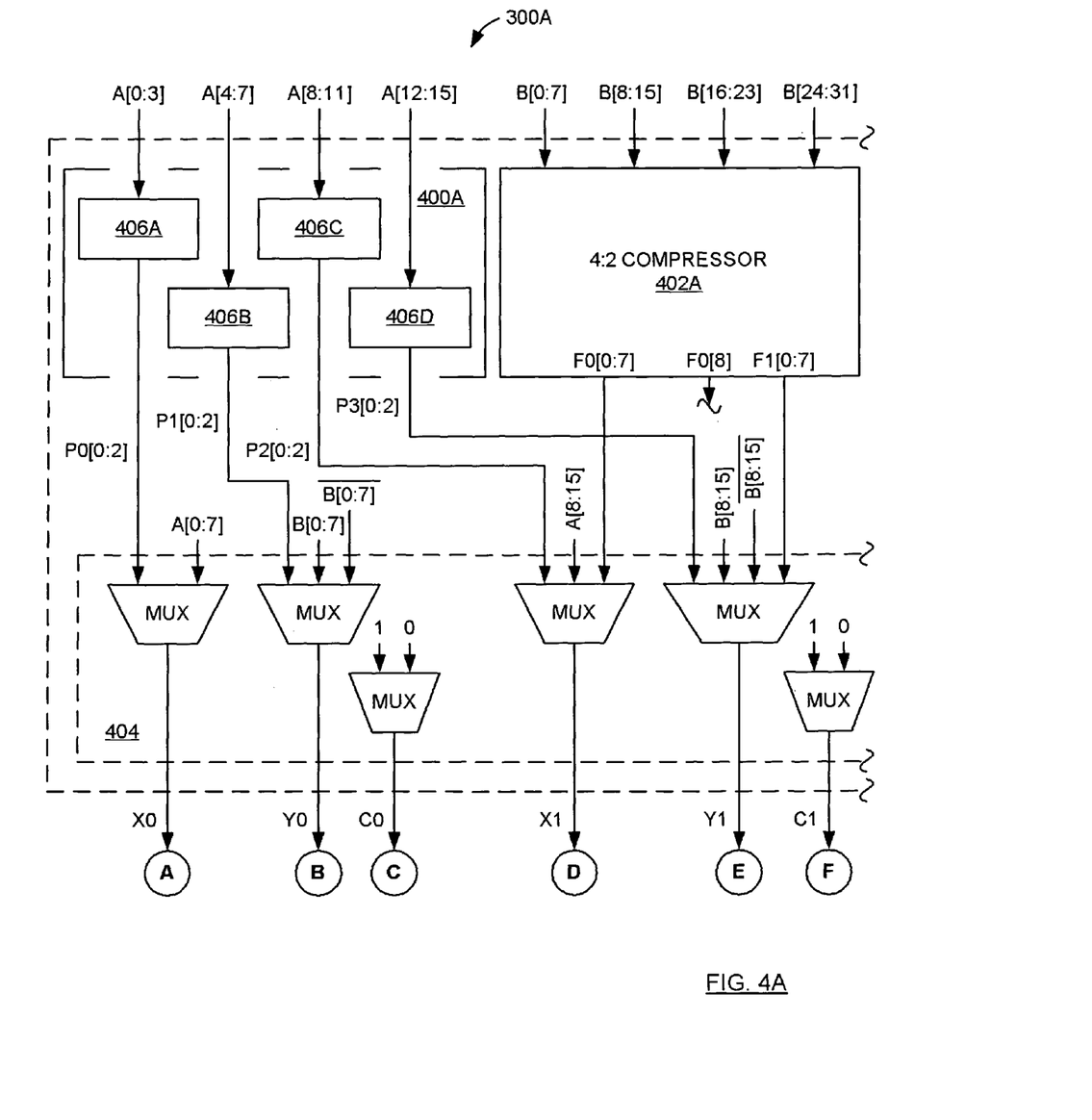
FIGS. 4A–4D in combination form a diagram of one embodiment of a representative one of the byte units of FIG. 3, wherein FIGS. 4A and 4C each includes a 4:2 compressor.

In one embodiment, the four byte units 300A–300D are substantially identical and operate similarly. FIGS. 4A–4D in combination form a diagram of one embodiment of the byte unit 300A of FIG. 3. A first population counter unit 400A, a first 4:2 compressor 402A, and a portion of adder input multiplexer (MUX) logic 404 are shown in FIG. 4A. The population counter unit 400A includes four separate population counters 406A–406D. Each of the population counters 406A–406D receives a different 4-bit quantity of the A[0:15] portion of the A[0:31] operand and produces an output signal indicating a number of logic '1's in the received 4-bit quantity.

Figure 5:
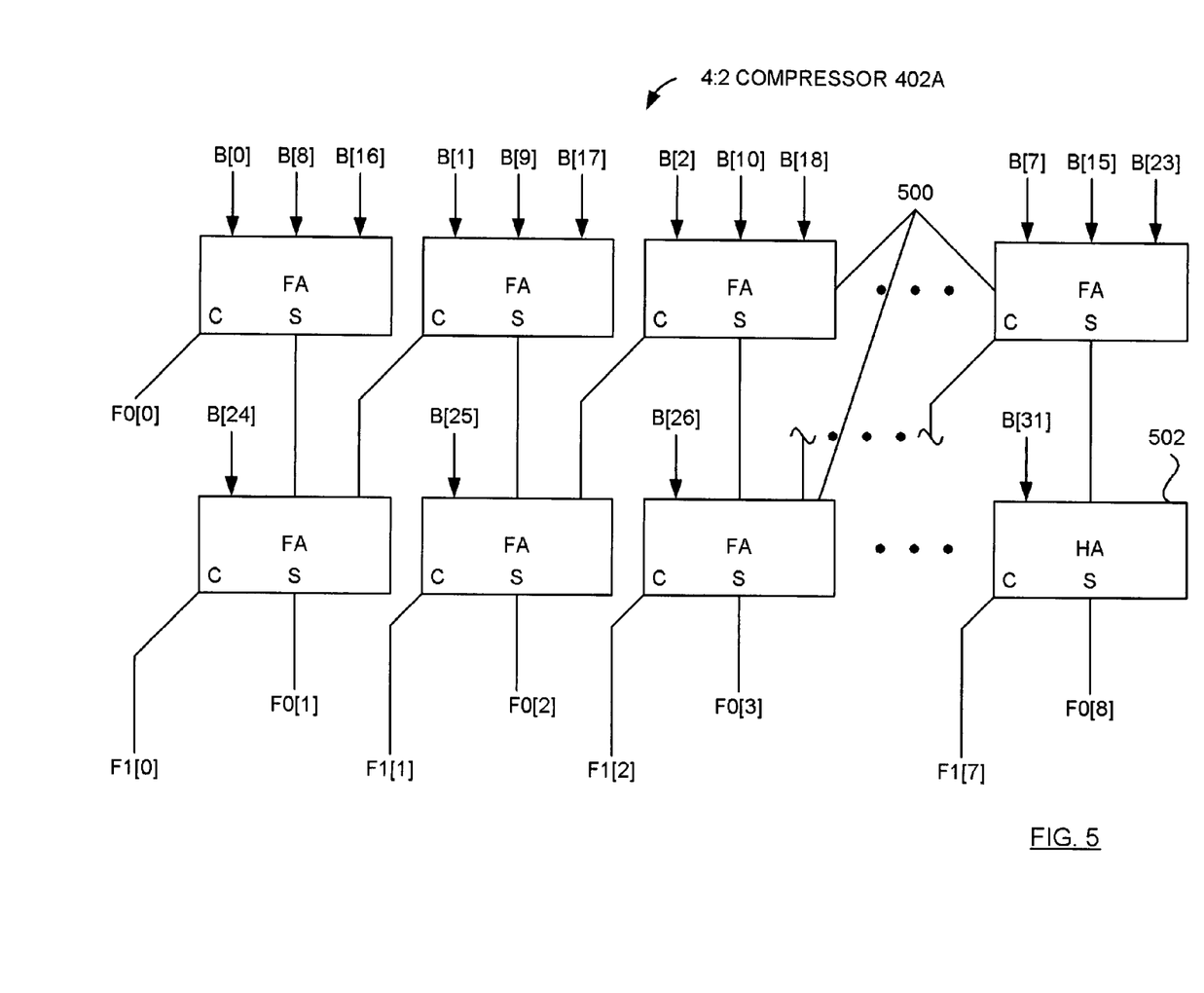
FIG. 5 is a diagram of one embodiment of the 4:2 compressor of FIG. 4A.

The 4:2 compressor 402A receives the B[0:31] operand and produces output signals "F0[0:7]," "F0[8]," and "F1[0:7]" wherein the F0[0] signal conveys a carry value resulting from an addition operation (B[0]+B[8]+B[16]), the F0[1:8] signal conveys a sum vector (see FIG. 5), the F0[8] signal conveys a sum value resulting from an addition operation (B[7]+B[15]+B[23]+B[31]), and the F1[0:7] signal conveys a vector (see FIG. 5).

The portion of the adder input MUX logic 404 shown in FIG. 4A includes several multiplexers receiving output signals produced by the population counter unit 400 and the 4:2 compressor 402 as input signals. Each of the multiplexers also receives one or more control signals from the control unit 302 of FIG. 3, and produces one of the input signals as an output signal dependent upon the one or more control signals. The portion of the adder input MUX logic 404 shown in FIG. 4A produces output signals "X0[0:7]" or simply "X0," "Y0[0:7]" or simply "Y0," "C0," "X1[0:7]" 0r simply "X1," "Y1[0:7]" or simply "Y1," and "C1."

Table 1 below shows the output signals produced by the portion of the adder input MUX logic 404 shown in FIG. 4A:

TABLE 1

Output Signals Produced by
The Portion of the Adder Input MUX Logic 404
Shown in FIG. 4A.

| INSTR. | X0[0:7] | Y0[0:7] | C0 | X1[1:7] | Y1[0:7] | C1 |
|---|---|---|---|---|---|---|
| ABSDB | A[0:7] | B_b[0:7] | 0 | A[8:15] | B_b[8:15] | 0 |
| AVGB | A[0:7] | B[0:7] | 1 | A[8:15] | B[8:15] | 1 |
| CNTB | '0000' +P0[0:2] | '0000' +P1[0:2] | 0 | '0000' +P2[0:2] | '0000' +P3[0:2] | 0 |
| SUMB | 0 | 0 | 0 | F0[0:7] | F1[0:7] | 0 |

As used herein, the suffix "_b" following a signal name indicates the logical complement of the signal. For example, the B_b[0:7] signal is the bitwise logical complement of the B[0:7] signal. The '+' symbols in Table 1 above represent a concatenation operation.

Figure 4B:
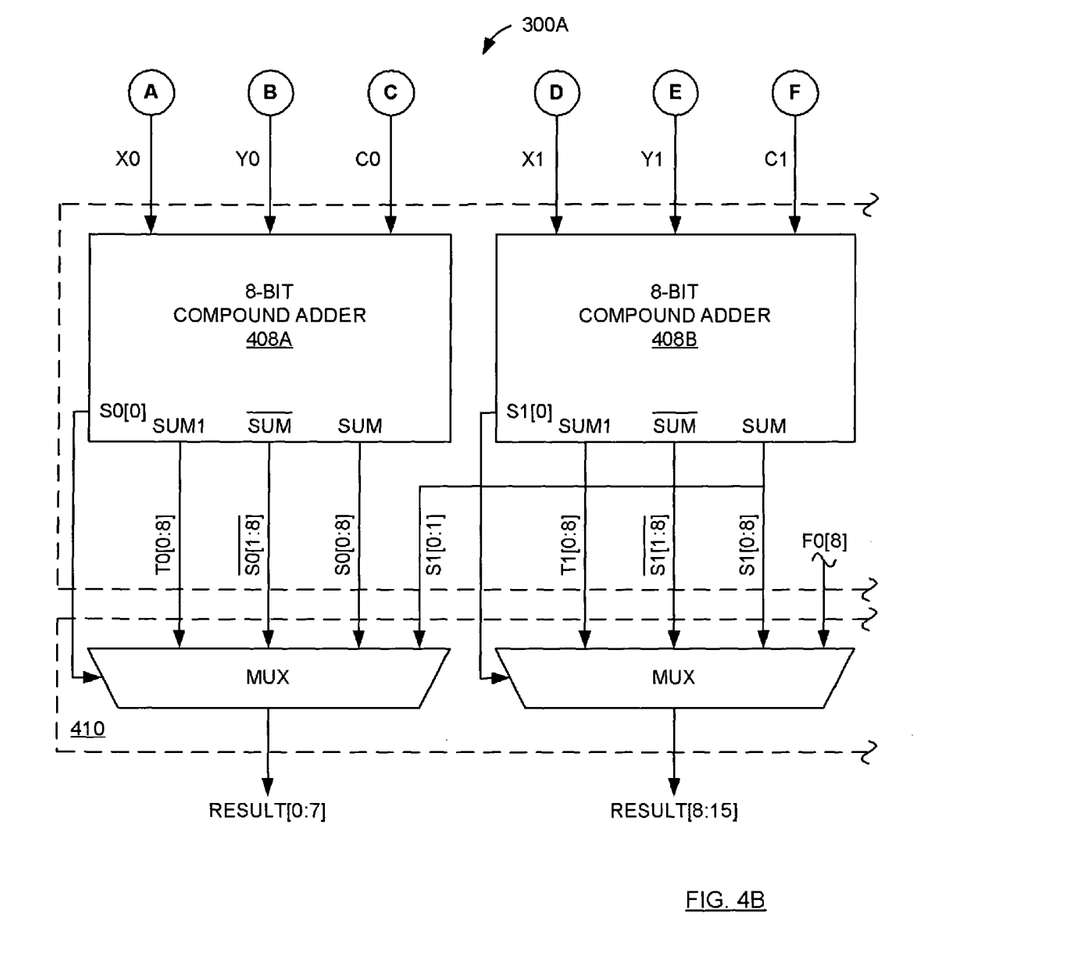

In FIG. 4B, two 8-bit compound adders 408A and 408B and a portion of result multiplexer (MUX) logic 410 are shown. The 8-bit compound adder 408A receives the X0, Y0, and C0 signals produced by the portion of the MUX logic 404 shown in FIG. 4A, and produces output signals "S0[0]," "SUM1/T0[0:8]," "SUM_b/S0_b[0:8]," and "SUM/S0[0:8]," wherein the SUM_b/S0_b[0:8] signal is the bitwise logical complement of the SUM/S0[0:8] signal.

The compound adder 408A produces the SUM/S0[0:8] signal by summing X0, Y0, and C0, i.e. SUM/S0[0:8]=X0[0:7]+Y0[0:7]+C0. The most significant bit S0[0] is the carry out, and bits S0[1:8] represent the 8-bit sum. The SUM1/T0[0:8] signal is produced by summing X0, Y0, and a carry in of '1', i.e., SUM1/T0[0:8]=X0[0:7]+Y0[0:7]+1.

The 8-bit compound adder 408B receives the X1, Y1, and C1 signals produced by the portion of the MUX logic 404 shown in FIG. 4A, and produces output signals "S1[0]," "SUM1/T1[0:8]," "SUM_b/S1_b[0:8]," and "SUM/S1[0:8]," wherein the SUM_b/S1_b[0:8] signal is the bitwise logical complement of the SUM/S1[0:8] signal.

The compound adder 408B produces the SUM/S1[0:8] signal by summing X1, Y1, and C1, i.e. SUM/S1[0:8]=X[0:7]+Y1[0:7]+C1. The most significant bit S1[0] is the carry out, and bits S1[1:8] represent the 8-bit sum. The SUM1/T1[0:8] signal is produced by summing X1, Y1, and a carry in of '1', i.e., SUM1/T1[0:8]=X1[0:7]+Y1[0:7]+1.

The portion of the result MUX logic 410 shown in FIG. 4B includes several multiplexers receiving output signals produced by the 8-bit compound adders 408A and 408B as input signals. Each of the multiplexers also receives one or more control signals from the control unit 302 of FIG. 3, and produces one of the input signals as an output signal dependent upon the one or more control signals. The portion of the result MUX logic 410 shown in FIG. 4A produces output signals "RESULT[0:7]" and "RESULT[8:15]."

Table 2 below shows the output signals produced by the portion of the result MUX logic 410 shown in FIG. 4B:

TABLE 2

Output Signals Produced by
The Portion of the Result MUX Logic 410
Shown in FIG. 4B.

| CONDITION | RESULT[0:7] | RESULT[8:15] |
|---|---|---|
| ABSDB | IF S0[0] = 1<br>THEN T0[1:8]<br>ELSE S0_b[1:8] | IF S1[0] = 1<br>THEN T1[1:8]<br>ELSE S1_b[1:8] |
| AVGB | T0[0:7] | T1[0:7] |
| CNTB | '0000'S0[5:8] | '0000'S1[5:8] |
| SUMB | '000000'S1[0:1] | S1[2:8]F0[8] |

It is noted that, as indicated in Table 2 above, when a SUMB instruction is fetched and executed, the 8-bit compound adder 408B produces a 10-bit result conveyed by the concatenated RESULT[0:7] and RESULT[8:15] signals.

Figure 4C:
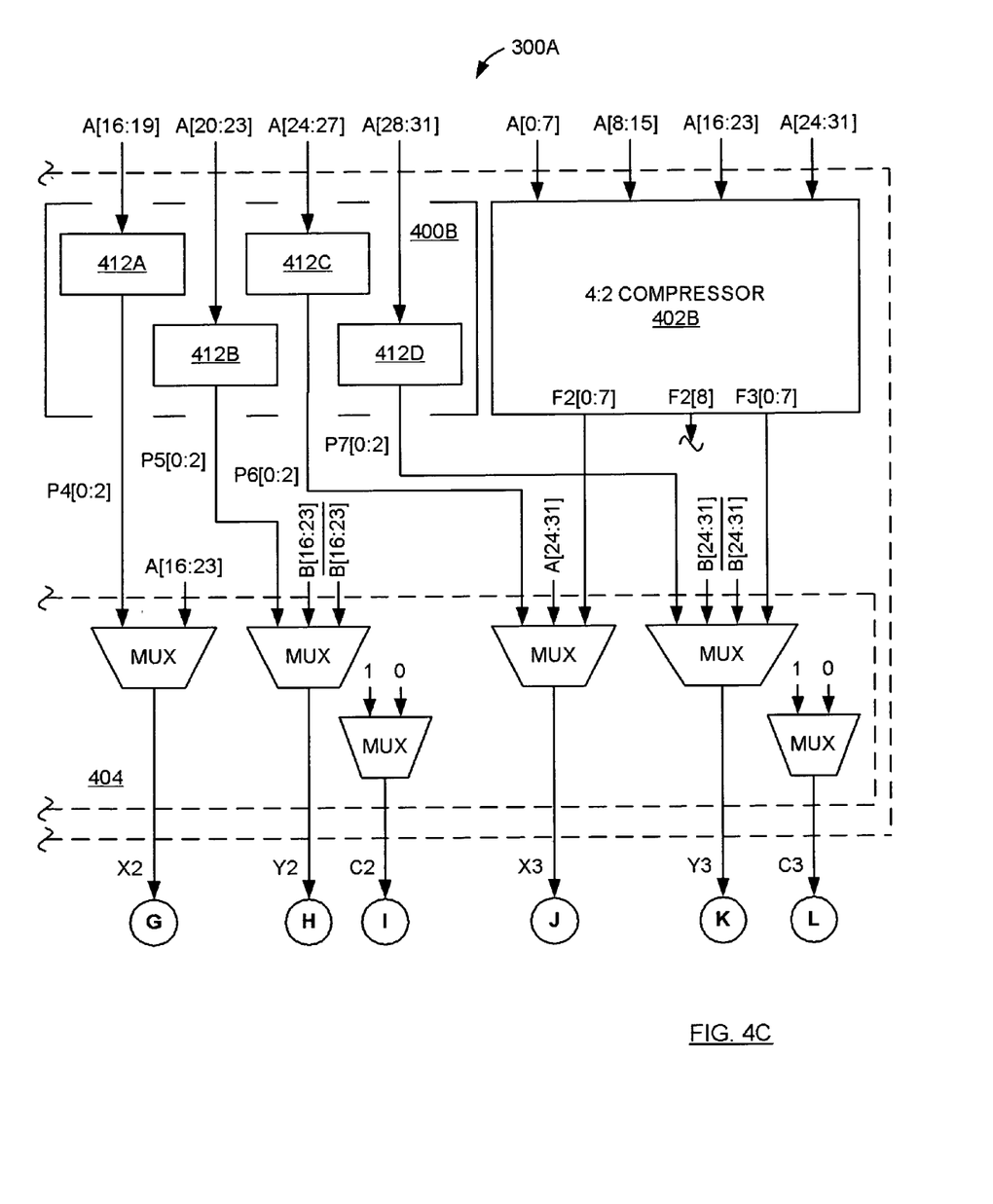

A second population counter unit 400B, a second 4:2 compressor 402B, and another portion of the adder input MUX logic 404 are shown in FIG. 4C. The population counter unit 400B includes four separate population counters 412A–412D. Each of the population counters 412A–412D receives a different 4-bit quantity of the A[16:31] portion of the A[0:31] operand and produces an output signal indicating a number of logic '1's in the received 4-bit quantity.

The 4:2 compressor 402B receives the A[0:31] operand and produces output signals "F2[0:7]," "F2[8]," and "F3[0:7]," wherein the F2[0] signal conveys a carry value resulting from an addition operation (A[0]+A[8]+A[16]), the F2[1:8] signal conveys a sum vector, the F2[8] signal conveys a sum value resulting from an addition operation (A[7]+A[15]+A[23]+A[31]), and the F3[0:7] signal conveys a carry vector.

The portion of the adder input MUX logic 404 shown in FIG. 4C includes several multiplexers receiving output signals produced by the population counter unit 400B and the 4:2 compressor 402B as input signals. Each of the multiplexers also receives one or more control signals from the control unit 302 of FIG. 3, and produces one of the input signals as an output signal dependent upon the one or more control signals. The portion of the adder input MUX logic 404 shown in FIG. 4C produces output signals "X2[0:7]" or simply "X2," "Y2[0:7]" or simply "Y2," "C2," "X3[0:7]" or simply "X3," "Y3[0:7]" or simply "Y3," and "C3."

Table 3 below shows the output signals produced by the multiplexers of the portion of the MUX logic 404 shown in FIG. 4C:

TABLE 3

Output Signals Produced by
The Portion of the Adder Input MUX Logic 404
Shown in FIG. 4C.

| INSTR. | X2[0:7] | Y2[0:7] | C2 | X3[1:7] | Y3[0:7] | C3 |
|---|---|---|---|---|---|---|
| ABSD | A[16:23] | B_b[16:23] | 0 | A[24:31] | B_b[24:31] | 0 |
| AVGB | A[16:23] | B[16:23] | 1 | A[24:31] | B[24:31] | 1 |
| CNTB | '0000'<br>+P4[0:2] | '0000'<br>+P5[0:2] | 0 | '0000'<br>+P6[0:2] | '0000'<br>+P7[0:2] | 0 |
| SUMB | 0 | 0 | 0 | F2[0:7] | F3[0:7] | 0 |

Figure 4D:
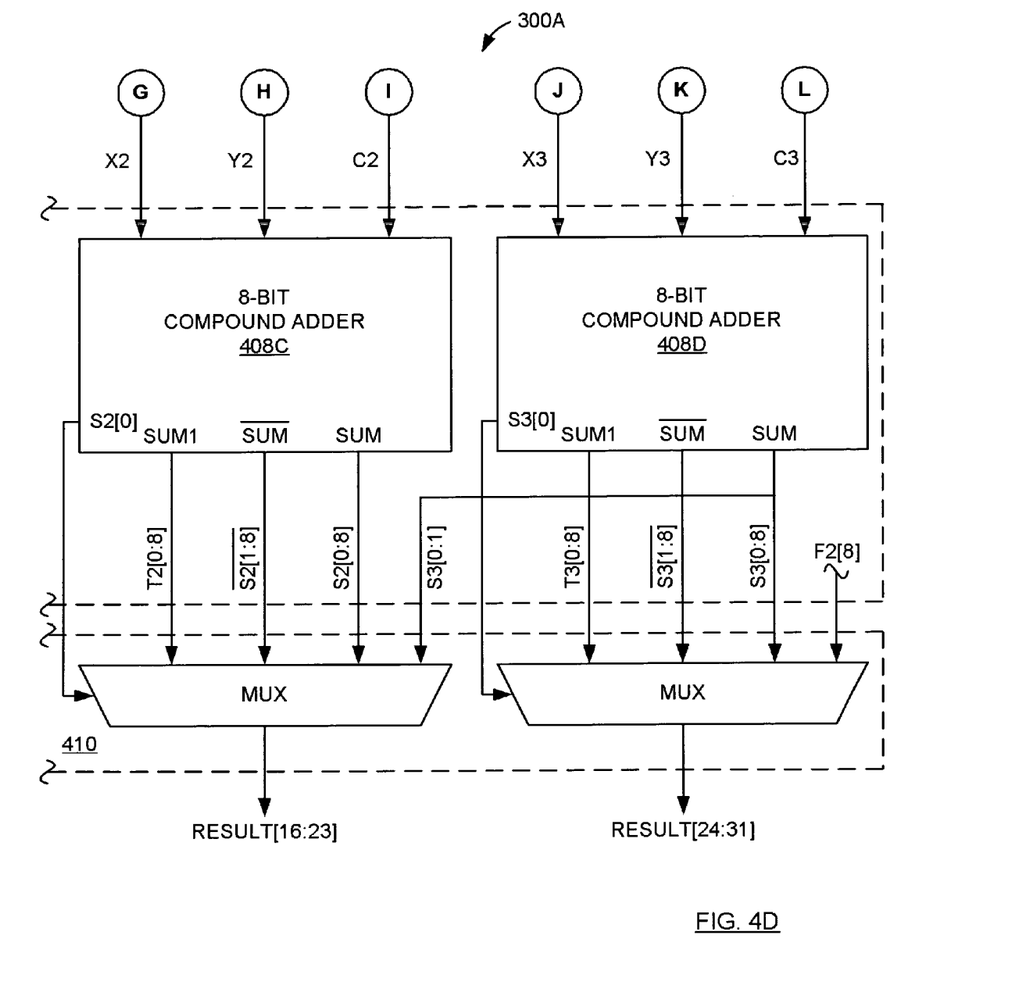

In Table 3 above, the '+' signal represents the concatenation operation. In FIG. 4D, two more 8-bit compound adders 408C and 408D and another portion of the result MUX logic 410 are shown. The 8-bit compound adder 408C receives the X2, Y2, and C2 signals produced by the portion of the MUX logic 404 shown in FIG. 4C, and produces output signals "S2[0]," "SUM1/T2[0:8]," "SUM_b/S2_b[0:8]," and "SUM/S2[0:8]," wherein the SUM_b/S2_b[0:8] signal is the bitwise logical complement of the SUM/S2[0:8] signal.

The compound adder 408C produces the SUM/S2[0:8] signal by summing X2, Y2, and C2, i.e. SUM/S2[0:8]=X2[0:7]+Y2[0:7]+C2. The most significant bit S2[0] is the carry out, and bits S2[1:8] represent the 8-bit sum. The SUM1/T2[0:8] signal is produced by summing X2, Y2, and a carry in of '1', i.e., SUM1/T2[0:8]=X2[0:7]+Y2[0:7]+1.

The 8-bit compound adder 408D receives the X3, Y3, and C3 signals produced by the portion of the MUX logic 404 shown in FIG. 4C, and produces output signals "S3[0]," "SUM1/T3[0:8]," "SUM_b/S3_b[0:8]," and "SUM/S3[0:8]," wherein the SUM_b/S3_b[0:8] signal is the bitwise logical complement of the SUM/S3[0:8] signal.

The compound adder 408D produces the SUM/S3[0:8] signal by summing X3, Y3, and C3, i.e. SUM/S3[0:8]=X3[0:7]+Y3[0:7]+C3. The most significant bit S3[0] is the carry out, and bits S3[1:8] represent the 8-bit sum. The SUM1/T3[0:8] signal is produced by summing X3, Y3, and a carry in of '1', i.e., SUM1/T3[0:8]=X3[0:7]+Y3[0:7]+1.

The portion of the result MUX logic 410 shown in FIG. 4D includes several multiplexers receiving output signals produced by the 8-bit compound adders 408C and 408D as input signals. Each of the multiplexers also receives one or more control signals from the control unit 302 of FIG. 3, and produces one of the input signals as an output signal dependent upon the one or more control signals. The portion of the result MUX logic 410 shown in FIG. 4D produces output signals "RESULT[16:23]" and "RESULT[24:31]."

Table 4 below shows the output signals produced by the portion of the result MUX logic 410 shown in FIG. 4D:

TABLE 4

Output Signals Produced by
The Portion of the Result MUX Logic 410
Shown in FIG. 4D.

| CONDITION | RESULT[0:7] | RESULT[8:15] |
|---|---|---|
| ABSD | IF S0[0] = 1 THEN T2[1:8] ELSE S2_b[1:8] | IF S3[0] = 1 THEN T3[1:8] ELSE S3_b[1:8] |
| AVGB | T2[0:7] | T3[0:7] |
| CNTB | '0000'S2[5:8] | '0000'S3[5:8] |
| SUMB | '000000'S3[0:1] | S3[2:8]F2[8] |

It is noted that, as indicated in Table 4 above, when a SUMB instruction is fetched and executed, the 8-bit compound adder 408D produces a 10-bit result conveyed by the concatenated RESULT[16:23] and RESULT[24:31] signals.

FIG. 5 is a diagram of one embodiment of the 4:2 compressor 402A of FIG. 4A. In the embodiment of FIG. 5, the 4:2 compressor 402A includes several full adder (FA) circuits 500 and a half adder circuit 502 arranged to form a two-dimensional array having two rows and eight columns. Each full adder circuit 500 receives three bits as inputs, and produces a 1-bit sum "S" and a 1-bit carry "C." The half adder circuit 502 receives two bits as inputs, and produces a 1-bit sum "S" and a 1-bit carry "C." Each row of adders essentially functions as a 3:2 compressor, the two 3:2 compressors being connected in cascade as shown in FIG. 5 to form the 4:2 compressor 402A.

The byte execution unit 106 of FIGS. 1 and 3 includes four separate byte units. Each of the four byte units includes two population counter units, two 4:2 compressors, and adder input MUX logic forming pre-processing logic. In general, the pre-processing logic performs an operation upon input operands dependent upon control signals produced by a corresponding control unit.

Each of the four byte units also includes four 8-bit compound adders that constitute adder logic. In general, the adder logic receives signals produced by the pre-processing logic and performs an addition operation upon the received signals, thereby producing a result. In some cases the result includes a sum signal and a sum+1 signal.

Each of the four byte units also includes result MUX logic forming post-processing logic. The post-processing logic receives the result produced by the adder logic and performs an operation upon the result dependent upon control signals produced by the corresponding control unit.

For example, as described above, an assembly language instruction using the "absolute differences of bytes" instruction ABSDB is expressed "ABSDB RT,RA,RB" wherein the RT register is the destination register and the RA and RB registers are the source registers. In general, for each byte, RT=ABS(RA−RB). The ABSDB instruction may be implemented as RT=((RA+RB_b+EAC) XOR EAC) where EAC=end-around-carry=CARRY(RA+RB_b). In this situation, the pre-processing logic may produce values X, Y, and C (i.e., CIN) for an 8-bit compound adder such that X=RA, Y=NOT(RB), and CIN=0. In general, the 8-bit compound receives the X, Y, and CIN signals, and produces signals "S[0:8]" and "T[0:8]" such that S[0:8]=X+Y and T[0:8]=X+Y+1. The post-processing logic produces a "RESULT" signal such that if S[0]=0 then RESULT=NOT(S[1:8]) else RESULT=T[1:8].

The "average of bytes" instruction AVGB may be expressed "AVGB RT,RA,RB" wherein the RT register is the destination register and the RA and RB registers are the source registers. In general, for each byte, RT=(RA+RB+1)>>1. The pre-processing logic may produce the values X, Y, and CIN for the 8-bit compound adder such that X=RA, Y=RB, and CIN=1. As described above, the 8-bit compound receives the X, Y, and CIN signals, and produces the signals S[0:8] and T[0:8] such that S[0:8]=X+Y and T[0:8]=X+Y+1. The pre-processing logic produces the RESULT signal such that RESULT=S[0:7].

The "count ones in bytes" instruction CNTB may be expressed "CNTB RT,RA" wherein the RT register is the destination register and the RA register is the source register. In general, for each byte, RT=COUNT_ONES(RA). The CNTB instruction may be implemented by counting the number of logic ones in 4-bit units of RA and adding the results. (This approach allows more generalized hardware to be used.) The pre-processing logic may produce the values X, Y, and CIN for the 8-bit compound adder such that X=COUNT_ONES(RA[0:3]), Y=COUNT_ONES(RA[4:7]), and CIN=0. As described above, the 8-bit compound receives the X, Y, and CIN signals, and produces the signals S[0:8] and T[0:8] such that S[0:8]=X+Y and T[0:8]=X+Y+1. The pre-processing logic produces the RESULT signal such that RESULT=S[1:8].

The "sum bytes into half words" instruction SUMB may be expressed "SUMB RT,RA,RB" wherein the RT register is the destination register and the RA and RB registers are the source registers. In general, for word slot:

RT[0:15]=RB[0:7]+RB[8:15]+RB[16:23]+RB[24:31]

RT[16:31]=RA[0:7]+RA[8:15]+RA[16:23]+RA[24:31]

A 4:2 compressor receives four 8-bit input vectors and produces two intermediate result vectors: a 9-bit vector F0[0:8] and an 8-bit vector F1[0:7]. The 8-bit compound adder receives F0[0:7] as X and F1[0:7] as Y, and computes the signal S[0:8] such that S[0:8]=F0[0:7]+F1[0:7]. The post-processing logic produces a 10-bit result signal "R[0:9]" such that R[0:9]={S[0:8], F0[8]}.

Figure 6:
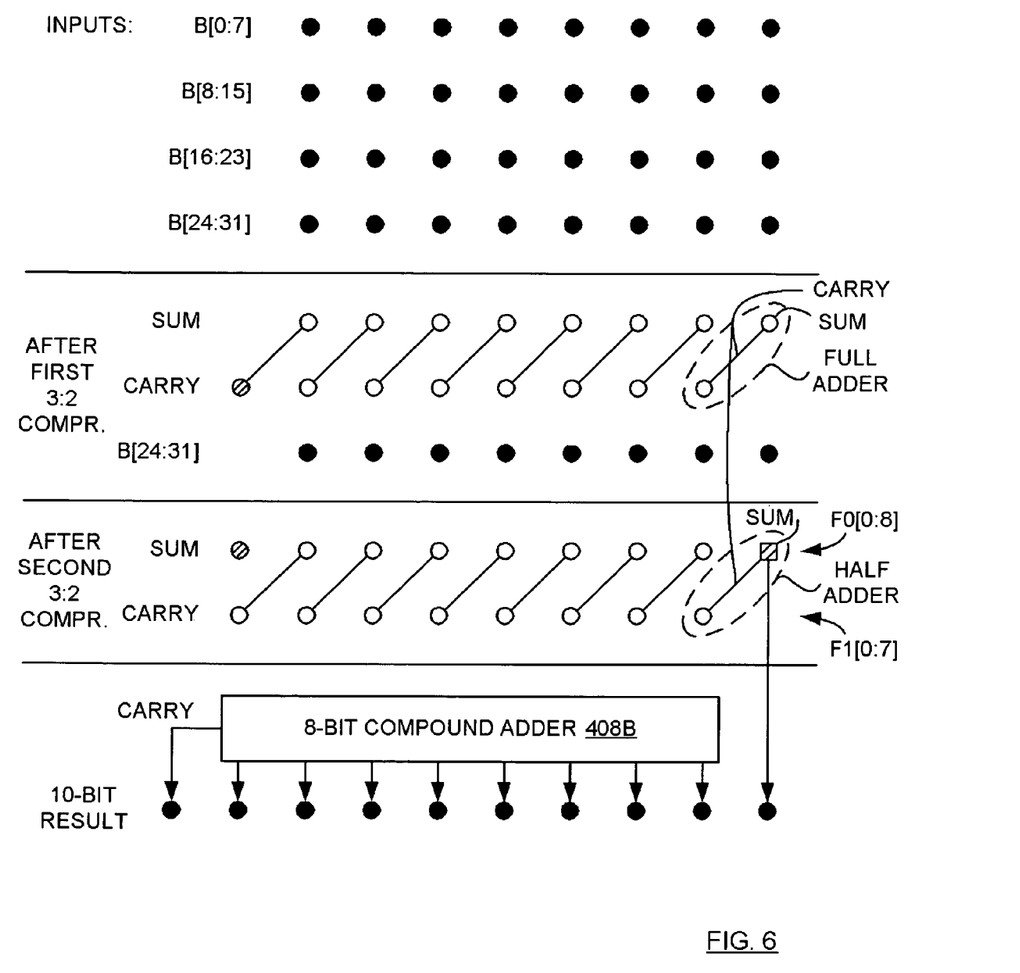
FIG. 6 is a diagram illustrating how logic of the byte unit of FIGS. 4A–4D computes a 10-bit sum of bytes using a 4:2 compressor and an 8-bit compound adder.

FIG. 6 is a diagram illustrating how logic of the byte unit 300A of FIGS. 4A–4D computes a 10-bit sum of bytes using the 4:2 compressor 402A and the 8-bit compound adder 408B. In general, the 4:2 compressor 402A receives the 32-bit operand B[0:31] and performs a compression operation upon the operand, thereby producing signals F0[0:8] and F1[0:7] as illustrated in FIG. 4A and described above. As indicated in FIG. 6, the 4:2 compressor 402A includes two 3:2 compressors in cascade. The 8-bit compound adder 408B receives the signals F0[0:7] and F1[0:7] produced by the 4:2 compressor 402A and sums the F0[0:7] and F1[0:7] signals, thereby producing a 10-bit result generally referred to as sum signal "S[0:9]." As indicated in FIG. 6, the signal F0[8] bypasses the adder 408B and becomes the least significant bit S[9] of the sum signal (i.e., S[9]=F0[8]). The carry out signal "CARRY" of the adder 408B becomes the most significant bit S[0] of the sum signal.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A byte execution unit, comprising:
   a plurality of byte units, wherein each byte unit comprises:
      a plurality of population counters each coupled to receive a portion of a first operand and configured to produce a population output signal indicative of a number of logic ones in the corresponding portion of the first operand;
      a first compressor unit coupled to receive a portion of the first operand and configured to produce a first plurality of compressor output signals dependent upon the first operand;
      a second compressor unit coupled to receive a portion of the second operand and configured to produce a second plurality of compressor output signals dependent upon the second operand;
      adder input multiplexer logic coupled to receive the population output signals and the first and second pluralities of compressor output signals as data input signals, and a first plurality of control signals, and configured to produce a portion of the data input signals as output signals dependent upon the first plurality of control signals;
      adder logic coupled to receive the output signals produced by the adder input multiplexer logic and configured to produce a plurality of adder output signals dependent upon the output signals produced by the adder input multiplexer logic; and
      result multiplexer logic coupled to receive the adder output signals as data input signals, and a second plurality of control signals, and configured to produce a portion of the data input signals as a result signal dependent upon the second plurality of control signals;
   wherein the byte execution unit is coupled to receive byte instruction information, and wherein the first and second pluralities of control signals are indicative of the byte instruction information, and wherein the byte instruction information specifies either a count ones in bytes operation, an average bytes operation, an absolute differences of bytes operation, or a sum bytes into halfwords operation.

2. The byte execution unit as recited in claim 1, wherein the first and second operands each comprise a plurality of bits, and wherein the bits of the first and second operands are grouped to form a plurality of corresponding 8-bit bytes.

3. The byte execution unit as recited in claim 2, wherein the first and second operands each comprise 128 bits, and wherein the bits of the first and second operands are grouped to form 16 corresponding bytes.

4. The byte execution unit as recited in claim 2, wherein in the event the byte instruction information specifies the count ones in bytes operation, the result signal is indicative of a number of logic one bits in each of the bytes of the first operand.

5. The byte execution unit as recited in claim 2, wherein in the event the byte instruction information specifies the average bytes operation, the result signal is indicative of averages of corresponding bytes of the first and second operands.

6. The byte execution unit as recited in claim 2, wherein in the event the byte instruction information specifies the absolute differences of bytes operation, the result signal is indicative of an absolute value of a result of subtraction operations wherein bytes of the first operand are subtracted from the corresponding bytes of the second operand.

7. The byte execution unit as recited in claim 2, wherein in the event the byte instruction information specifies the sum bytes into halfwords operation, the result signal is indicative of sums of values of consecutive bytes of the first and second operands.

8. The byte execution unit as recited in claim 2, wherein the first compressor unit of one of the byte units is coupled to receive a 32-bit portion A[0:31] of the first operand, and wherein the first plurality of compressor output signals produced by the second compressor unit comprises output signals F2[0:7], F2[8], and F3[0:7], and wherein the F2[0] signal conveys a carry value resulting from an addition operation A[0]+A[8]+A[16], and wherein the F2[1:8] signal conveys a sum vector, and wherein the F2[8] signal conveys a sum value resulting from an addition operation A[7]+A[15]+A[23]+A[31], and wherein the F3[0:7] signal conveys a carry vector.

9. The byte execution unit as recited in claim 2, wherein the second compressor unit of one of the byte units is coupled to receive a portion B[0:31] of the second operand, and wherein the second plurality of compressor output signals produced by the second compressor unit comprises output signals F0[0:7], F0[8], and F1[0:7], and wherein the F0[0] signal conveys a carry value resulting from an addition operation B[0]+B[8]+B[16], and wherein the F0[1:8] signal conveys a sum vector, and wherein the F0[8] signal conveys a sum value resulting from an addition operation B[7]+B[15]+B[23]+B[31], and wherein the F1[0:7] signal conveys a carry vector.

10. The byte execution unit as recited in claim 2, wherein the adder logic comprises a plurality of 8-bit compound adders.

11. The byte execution unit of claim 1, wherein responsive to a count ones in bytes operation, the byte execution unit counts a number of logical one bits in each byte of at least a first operand and stores each result in a corresponding byte of a destination register;
   wherein responsive to an average bytes operation, the byte execution unit averages each byte of the first operand with a corresponding byte of a second operand and stores each result in a corresponding byte of the destination register;
   wherein responsive to an absolute differences of bytes operation, the byte execution unit subtracts each byte of the first operand from a corresponding byte of the second operand to form an intermediate result, determines an absolute value of each intermediate result to form a final result, and stores each final result in a corresponding byte of the destination register; and
   wherein responsive to a sum bytes into halfwords operation, the byte execution unit sums a number of corresponding one-byte portions of the first operand or the second operand and stores each result in a corresponding halfword of the destination register.

* * * * *